J. H. MYERS.
Harvester-Rake.

No. 162,405.  Patented April 20, 1875.

Witnesses:
Alex Mahon
John G. Center

Inventor:
Jacob H. Myers
by A. M. Smith,
Attorney

THE GRAPHIC CO. PHOTO-LITH. 39 & 41 PARK PLACE, N.Y.

UNITED STATES PATENT OFFICE.

JACOB H. MYERS, OF ROCHESTER, NEW YORK, ASSIGNOR TO HUBBARD HARVESTER COMPANY, OF MINNEAPOLIS, MINNESOTA.

IMPROVEMENT IN HARVESTER-RAKES.

Specification forming part of Letters Patent No. 162,405, dated April 20, 1875; application filed February 16, 1875.

*To all whom it may concern:*

Be it known that I, JACOB H. MYERS, of Rochester, county of Monroe and State of New York, have invented a new and useful Improvement in Harvesters, of which the following is a full, clear, and exact description, reference being had to the accompanying drawing, making part of this specification, in which—

Figure 1:
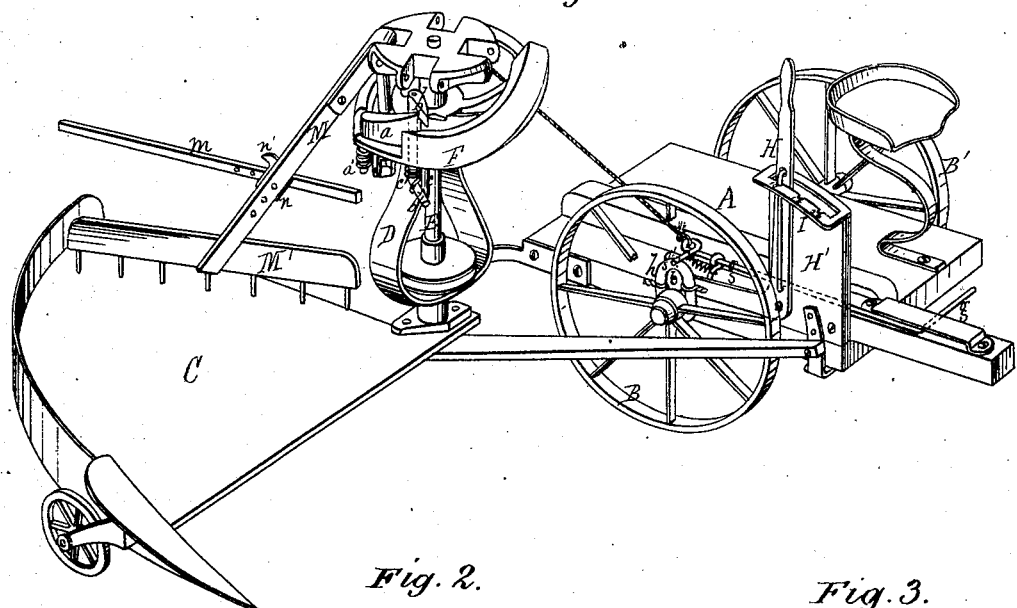
Figure 2:
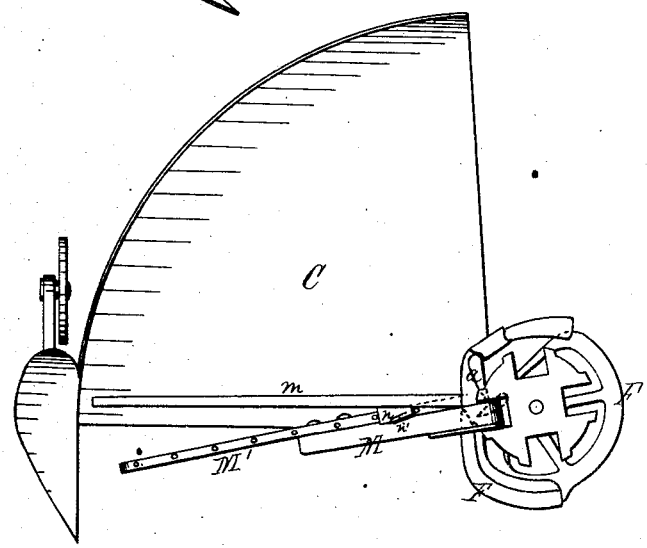
Figure 3:
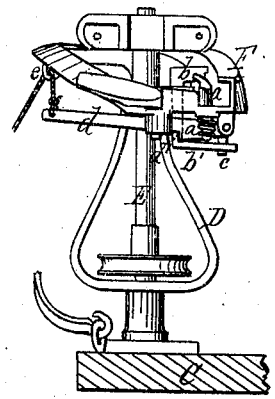
Figure 4:
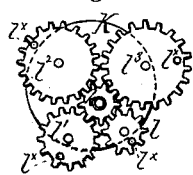

Figure 1 is a perspective view of so much of a harvesting-machine as is necessary to show my improvements. Fig. 2 is a plan or top view of the rake-head and beater or gathering-arm, showing their relation to each other and to the forward edge of the platform in passing over the same. Fig. 3 is a rear elevation of the rake-stand, showing the arrangement of the tripping-lever; and Fig. 4 shows in side elevation a modification of the device for determining the distance apart of the gavels.

Similar letters of reference denote corresponding parts wherever used.

The invention relates to that class of raking attachments known as the combined rake and reel, in which the rake and reel arms, pivoted to a central head, revolve about a vertical or nearly vertical shaft or pivot, and in which any one (or all) of the arms or heads used for gathering the grain into the cutters may be made to act as a rake for removing the grain from the platform; and consists in the combination, with the rake and reel, of a novel means, placed under the control of the driver, in his seat on the machine, whereby the driver is enabled, while the machine is in operation, to regulate the distance apart of the discharge of the gavels, and, consequently, the size thereof, by mechanism, which, when set by the driver, will cause the gavels to be discharged automatically and at regular intervals, as hereinafter described.

The invention further consists in a novel arrangement of the latches for setting and tripping the gate which regulates the path of the rake and reel-arms; and, lastly, in a novel arrangement of gathering-arm or beater, relatively to the rake-arm and rake-head, and to the means for attaching said beater, as hereinafter described.

In the accompanying drawing, A represents the main frame of the machine; B B', the carrying and driving wheels; C, the grain-platform, connected with the main frame by the adjustable drag-bar, and any usual or preferred form of hinge or lateral brace-connection from the lower heel end of said drag-bar. D is the rake-stand or yoke, located at the inner front corner of the platform, and affording a support for the vertical rake-shaft E, and at its upper end for the cam track or way F, which governs the path of the rakes, pivoted to the central head connected with the upper end of the shaft E, and overhanging the cam-track. This cam-track has a spring latch or gate, $a$, the position of which determines the path the rake-roller upon the heel extension of the rake and reel arms shall pursue, and, consequently, whether said arms shall act as rake or as reel arms. This latch or gate is held in position for causing the arms all to act as reel-arms, by means of a spring, $a'$, the tension of which serves to hold the forward end of the gate in against the inner face of the cam track or groove, thus compelling the roller to take the path outside of said gate for lifting the rakes out of the grain and leaving it on the platform. The swinging end of this gate projects slightly above the inner side of the cam-groove, and is notched to receive the outer swinging end of a cam-arm, $b$, which, when it is desired to have the rollers pursue the inner track for causing the rakes to discharge the grain, rests in said notch, projecting forward and outward, intercepting the path of the rake-roller in such manner that the advancing roller crowds the cam-arm $b$ backward and outward, carrying the gate outward with it until the roller passes inside the forward end of said gate, and thence pursues the path, causing the arm to which it is connected to act as a rake-arm, the roller carrying the cam-arm $b$ backward until it frees the gate, which, by reason of the tension of the spring $a'$, immediately resumes the position for causing the arms to act as gathering-arms only.

The cam $b$ is connected with a vertical pivot, which passes through the cam-plate, and has a crank-arm, $b'$, connected with its lower end, which is held against a stop-pin, $c$, by the tension of a spring, $c'$. When the cam-arm $b$ is carried backward by the rake-roller, as desired, overcoming the tension of the spring $c'$, the arm $b'$ is carried with it in contact with the lower inclined face of a weighted or spring latch, $d$, until it passes a shoulder, $d'$, on said latch, when the latch drops down, causing the shoulder $d'$ to grasp and retain the arm $b'$ until it is released from the latch $d$, when the tension of the spring causes the arm $b'$ to return instantly to the stop $c$, bringing the cam $b$ into position to again act on the cam-gate, as described. The latch-lever $d$, at its outer or forward end, is pivoted to the lower face of the cam-plate, and at its inner end has a cord connected with it, which passes up through a guide loop or eye, $e$, and thence to a sliding rod or bar, $g$, moving in ways or guides on the main frame. The forward end of this slide is bent at angle, forming a stirrup, in convenient position to be operated by the driver's foot for lifting the latch $d$, and releasing the cam $b$ whenever it is desired to remove the grain from the platform, this arrangement placing the discharge of the gavels under the control of the driver.

For the automatic discharge of the gavels at any desired distance apart, the following arrangement of means is employed: Upon any convenient shaft of the machine (shown in the present instance on the main axle, and formed on the hub of wheel B) is a pulley, from which an elastic belt or band, $h$, passes around a loose pulley, $i$, mounted on a stub-axle or pin formed upon or secured to one arm of an elbow-lever, H, pivoted to the main frame, or upon a standard, H', thereon. The elastic belt $h$ has one or more teeth or spurs attached to it, which, at each revolution, strike against a spur, $g'$, on the slide $g$, and, forcing said spur and the slide forward, cause the latch $d$ to be automatically tripped for releasing the cam-arm $b$. These spurs will ordinarily be placed at such distance apart on the belt as to trip the cam-arm $b$ about once for each ten feet traveled by the machine, as follows: Supposing the diameter of the driving-wheels to be, say, thirty-two inches, then, at each revolution of said wheels the machine will move forward about eight feet. Now, supposing the pulley driving the belt $h$ to be two inches in diameter, and to revolve with the driving-wheel, and at the same speed, the spurs on the belt must be placed at a distance apart thereon equal to the circumference of a pulley two and a quarter inches in diameter, in order to cause them to release the cam-arm once in each ten feet passed over by the machine. This being the normal arrangement of the spurs, if, by the vibration of the lever H, the elastic belt is extended until the distance between the spurs is increased by one-half, the spurs will release the cam-arm once in each fifteen feet traveled by the machine, and if the distance apart of said spurs be doubled by the extension of the belt the gavels will be discharged once in every twenty feet. The lever H, when adjusted for extending the belt, as described, may be held by a graduated rack, I, secured to the standard H', the number upon which may be made to indicate the point at which the lever H is to be set to cause the rake to discharge the grain at any given number of feet traveled by the machine.

Instead of the extensible belt described, a series of spur-gears, arranged around and meshing each with a central spur driving-gear, as shown in Fig. 4, may be employed. The central gear $k$ may be placed upon any shaft of the machine convenient for the purpose.

The wheels $l$ $l^1$ $l^2$, meshing therewith, have their bearings on pins connected with a disk, K, or its equivalent, which is made adjustable for bringing any one of the wheels $l$ $l^1$ $l^2$ into position to actuate the slide $g$. Each of these wheels is provided near its periphery with a pin or spur, $l^{\times}$, which, when the disk is adjusted to cause the wheel to actuate the slide, once in each revolution strikes against a spur on the slide $g$, and thus trips the cam-arm $b$. Under this arrangement, supposing the diameter of the drive-wheel to be the same as given above, and the diameter of the central driving-gear to be two inches, to discharge once in each ten feet will require a pinion, $l$, of two and one-fourth inches in diameter, once in each fifteen feet a pinion, $l'$, of three and three-eighth inches in diameter, and so on. The disk K may be retained in position for discharging the gavels at the shortest intervals by a stop-pin, against which it is held by a coiled spring; and a cord passing around a drum, and connected with the lever H, may be used for rotating the disk against the tension of the spring for bringing any one of the wheels $l$ into position to actuate the slide $g$, as the condition of the crop may require. Or, instead of the cord or chain, a reciprocating rack engaging with the disk K, toothed on its periphery for that purpose, may be made to rotate the disk, as desired. By placing the center driving-gear on a slower shaft its diameter may be increased, and the diameters of the tripping-wheel correspondingly diminished and their number thereby increased, if desired. To the rake and reel arms M supplementary beaters or gathering-arms $\dot{m}$ are attached, above the heads M', and set obliquely thereto, as shown in Fig. 2, in such manner that, while the position of the rake-shaft in rear of the forward edge of the platform causes the rake-heads to pass over said forward edge in a line oblique thereto, the outer ends of the beaters $m$ are set sufficiently in advance of the line of the rake-head to cause them to pass over the forward edge of the platform on a line parallel therewith, or nearly so, to prevent the standing grain from being crowded outward. The beater is connected with the rake-arm by a socket-piece or block, $n$, recessed on its opposite faces or sides, one clamping the rake-arm and the other the beater $m$, the recessed faces being formed at the desired angle to give the arm and beater the oblique relation shown, and the arm and beater are both perforated to permit the adjustment of the height of the beater, and its withdrawal inward or projection outward according to the position of the beater on the arm; and they are united by a single through-bolt, which, in connection with the recessed socket-pieces, effectually secures the beater to the arm. This relation of the beater to the rake-head, in effect, duplicates the number of the gathering-beaters, besides obviating the injurious outwardly-crowding action of the beaters. A spur or finger, $n'$, on the socket-piece, prevents the straw from slipping inward and getting into the rake-driving mechanism. This clasp $n$, by its peculiar construction, facilitates the adjustment of the beater, to adapt it to the varying conditions of different crops, the removal of the single through-bolt from one hole to another being all that is required to effect its adjustment.

Having now described my invention, what I claim as new, and desire to secure by Letters Patent, is—

1. The spring cam-arm $b$, actuated by the rake-roller, as described, for opening the switch or gate in the cam-track, causing the arm to act as rake-arms, in combination with the weighted or spring latch $d$ for holding the cam-arm away from the switch or gate when it is desired that the rake-heads shall act as gatherers only, substantially as described.

2. The combination, with the rake-tripping devices, of an index-arm or lever, controlled by the driver on the machine, for setting said tripping devices, to cause the rake automatically to discharge the gavels at any desired regular distances apart, substantially as described.

3. The adjustable beaters $m$, applied to the rake-arms, above and in front of the rake-heads, and set obliquely to said heads, substantially as and for the purpose set forth.

4. The angular clasp or socket-piece $n$, with its spur or finger $n'$, and single through-bolt, in combination with the rake-arms and the adjustable beaters $m$, for uniting said beaters to the rake-arms, as described.

In testimony whereof I have hereunto set my hand this 29th day of October, 1874.

J. H. MYERS.

Witnesses:
CHAUNCEY NASH,
LOUIS K. NASH.